United States Patent
Mauchan

[11] Patent Number: 5,828,908
[45] Date of Patent: Oct. 27, 1998

[54] PHOTO CABIN

[76] Inventor: Donald E. Mauchan, 85 Pheasant Hill Rd., Marlboro, Mass. 01752

[21] Appl. No.: 932,783

[22] Filed: Sep. 18, 1997

[51] Int. Cl.⁶ .................................................. G03B 15/00
[52] U.S. Cl. ........................................ 396/2; 396/3; 396/4
[58] Field of Search .................................... 396/1, 2, 3, 4

[56] References Cited

U.S. PATENT DOCUMENTS

| | | | |
|---|---|---|---|
| 105,665 | 7/1870 | Foss | 396/3 |
| 1,015,292 | 1/1912 | Calhoun | 396/3 |
| 1,954,869 | 4/1934 | Fitch | 396/3 |
| 3,821,760 | 6/1974 | Kennedy et al. | 396/2 |
| 4,771,305 | 9/1988 | Potoroka | 396/2 |

Primary Examiner—David M. Gray
Attorney, Agent, or Firm—Donald F. Mofford

[57] ABSTRACT

The photo cabin of the invention provides a background for an image, subject lighting and possibly support for an external camera; furthermore, the photo cabin is foldable, thereby facilitating transport, handling and storage. Electrical power and signal connections for controlling and energizing the subject lighting are also included.

12 Claims, 5 Drawing Sheets

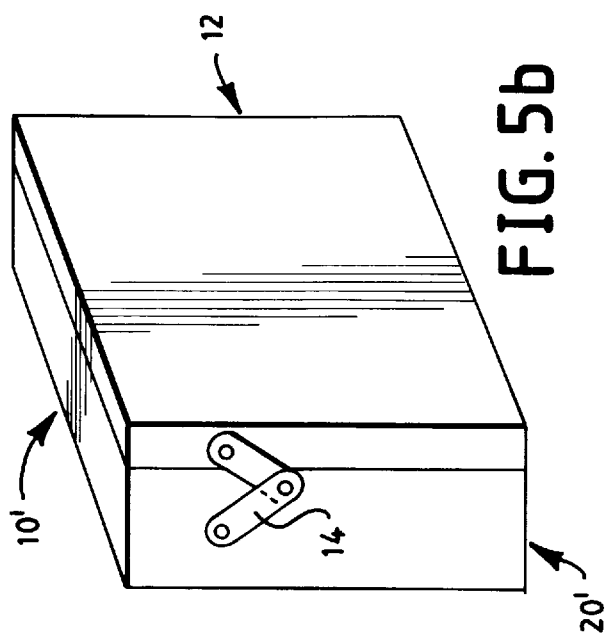
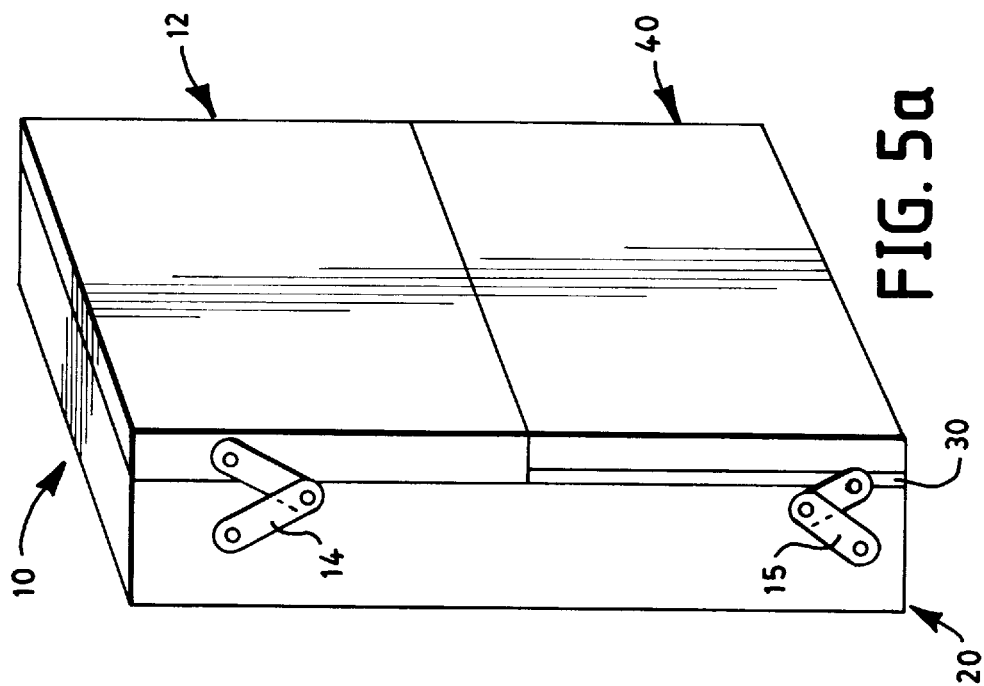

PHOTO CABIN

BACKGROUND OF THE INVENTION

The invention relates to a photo cabin for capturing an image of a subject, the photo cabin including an enclosure providing a background for the image, subject lighting and preferably support for an external camera. In particular, the photo cabin which is designed for ease of transport, handling and storing.

Automatic photo booths in which the user can take an instant photographic image, especially a self portrait, have become popular with the advent of photography on self-developing film, as described, for example, in U.S. Pat. No. 3,821,760. A photo booth of this type usually includes a housing comprising a studio or background compartment containing a seat for the subject and a set of lights, preferably strobe lights, and an apparatus compartment adjacent to the studio compartment containing a camera, an apparatus for automatically operating the camera to expose a film unit and then processing the exposed film unit when payment for the photographic image is deposited by the user. The camera in the photo booth described above uses self-developing film; more recently, however, electronic image capturing and viewing devices have either been provided in addition to the film camera or have replaced the film camera entirely.

Whereas the flexibility with which instant images can be produced in an automatic photo booth and the quality of these images has vastly improved since the inception of the photo booth through the addition of novel features, especially of an electronic nature, the basic construction of the photo booth has remained largely unchanged. Most photo booths known in the art are assembled as one unit comprising the aforedescribed two housings and a floor panel and a ceiling panel for spacing the two housings apart. Consequently, a large floor space is required for transporting and placing such assembled photo booth.

In the commonly assigned U.S. patent application Ser. No. 08/749,497 by D. Mauchan entitled *Photo Booth with Modular Construction,* which is incorporated herein by reference, there is disclosed a photo booth of modular design adapted for convenient assembly, disassembly and handling, which can be bundled in a manner where it occupies a substantially smaller floor space than when it is operational as a photo booth. The abovedescribed photo booth has a background (or studio) module, an apparatus module, a hinged floor panel linking the bottom of the apparatus module and the bottom of the background module, and a detachable roof module linking the top of the apparatus module and the top of the background module. When the photo booth is prepared for transport and/or shipment, the floor panel is pivoted about its hinged support into a vertical position proximate to the front wall of either the apparatus or the background module and secured thereto. The roof is also detached and placed vertically next to the modules. As a result, the so prepared photo booth requires very little floor space.

For certain applications, however, it may be sufficient or even preferable to use an existing camera, for example a hand-held camera or a camera supported by a stationary support, such as a tripod, instead of an apparatus module having a built-in camera, thereby obviating the need for a separate apparatus module. It would, however, still be desirable to provide a controlled background motif, possibly a seating area, and controlled lighting for the subject to be photographed.

OBJECT AND SUMMARY OF THE INVENTION

With the foregoing in mind, it is therefore an object of the invention to provide a novel photo cabin for use with an external camera, wherein the photo cabin is of modular and/or foldable design, inexpensive, easy to set up, and convenient to transport and handle. It is another object of the invention to provide a photo cabin which, in its disassembled state, occupies a substantially smaller floor space than when it is operational as a photo cabin.

It is a further object of the invention to include lighting means for illuminating the subjects whose picture is to be captured. Preferably, these lighting means are strobe lights and are activated and/or controlled by the external camera.

In preferred embodiment, the photo cabin is provided with its own internal power source, such as a battery, for supplying power to the lighting means.

The photo cabin may advantageously also include a camera support, such as a camera support module or a tubular structure, for supporting the external camera.

In another preferred embodiment, the photo cabin is adapted to be secured to a wall or a structural member of an existing building.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 5a illustrates the photo cabin of FIG. 2 folded and arranged for shipping and storing; and FIG. 5b illustrates the photo cabin of FIG. 4 folded and arranged for shipping and storing.

DESCRIPTION OF THE PREFERRED EMBODIMENTS

Figure 1:
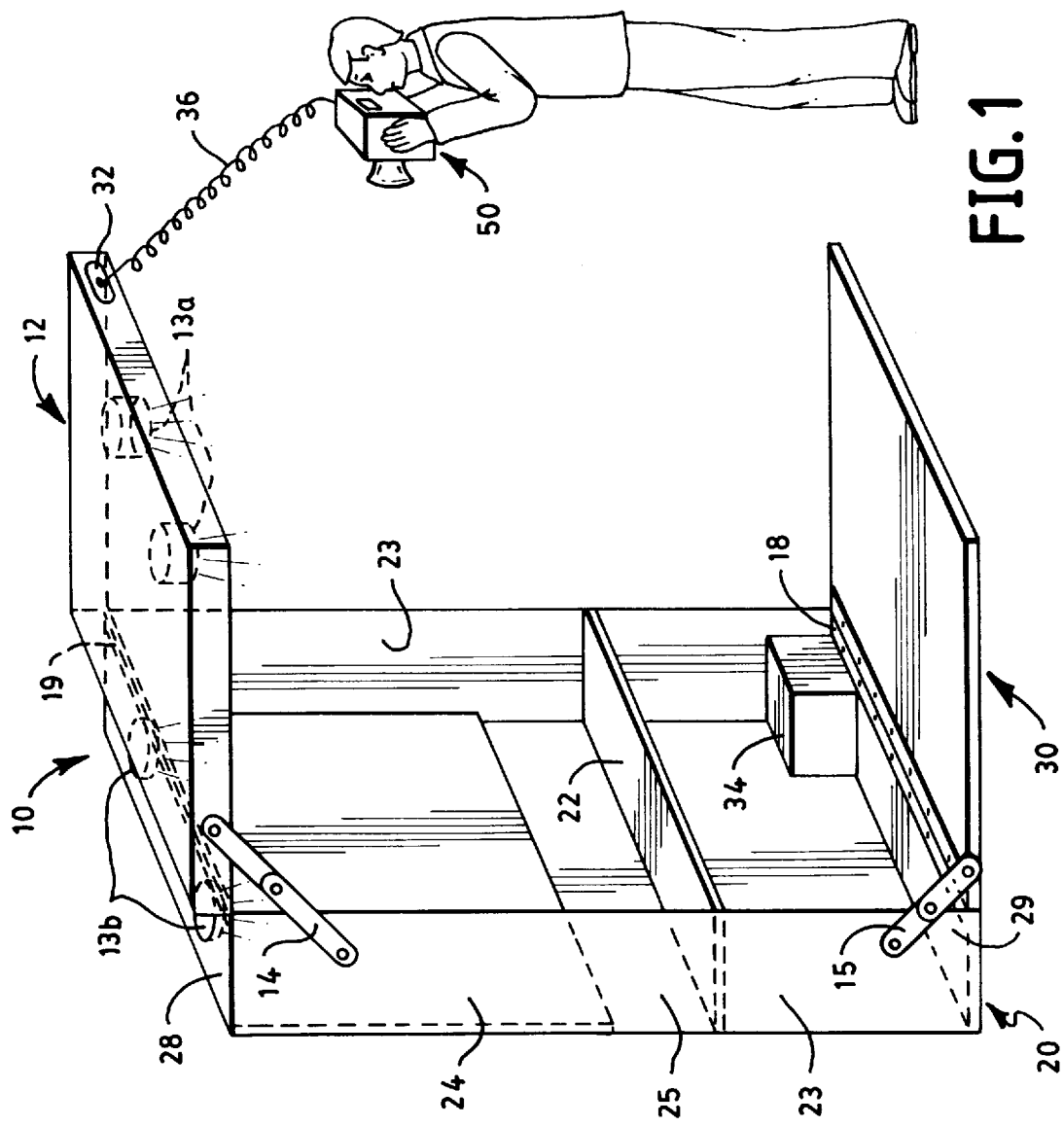
FIG. 1 is a perspective view of a modular photo cabin according to an embodiment of the invention in the assembled state and ready for taking pictures.

Several preferred embodiments of the invention will be described hereinafter with reference to the drawings. Like parts are referenced with like reference numerals. Referring first to FIG. 1, there is shown a perspective view of a photo cabin 10 according to the present invention including a background module 20 which is shown for purposes of illustration as an upstanding box-like structure with a (vertical) back wall 25, side walls 23 (only one thereof is shown), a top 28 and a bottom 29, but which may have other suitable shapes. A floor member 30 is attached with one of its ends through a hinge 18 to the bottom 29 of the background module for pivoting by 90° about the axis of the hinge 18; a roof member 12 is attached with one of its ends through a hinge 19 to the top 28 of the background module 20 for pivoting by 90° about the axis of the hinge 19. Both the floor member 30 and the roof member 12 can be secured in their respective horizontal position, i.e. the position illustrated in FIGS. 1 to 3 where the roof 12 and floor member 30, respectively, are oriented perpendicular to the back wall 25, by at least one lockable linking assembly 14, 15 (for sake of clarity, only one of each respective linking assembly 14, 15 is shown in the Figures). As a result of these design features, the photo cabin 10 is capable of resting stably and safely on a floor without any additional support.

The background module 20 may comprise a seat 22, which is preferably adjustable in height (not shown in the Figures), and a background 24 which preferably comprises patterned, colored, printed, and/or pictured areas or any other appropriate motif, such as a company color or a logo, or a motif selected by the subject to be photographed. The background 24 may also be of a uniform blue color, allowing an electronic overlay of the image of the subject captured by the external camera 50 if the camera 50 is an electronic camera, with an electronically rendered background in a manner known in the art.

Most preferably, the photo cabin of the invention includes lighting means, such as one or more strobe or flash lights, for illuminating the subject to be photographed. Such lighting means, indicated in FIGS. 1 to 4 by the reference numbers 13a, are advantageously attached to the roof member 12 and either are directed towards the subject for illuminating the subject directly, or are pointing away from the subject for reflection by a diffuser, as is known in the art, for providing a softer, more indirect illumination. Additional lighting means 13b may be incorporated in the background module 20. Both the roof lighting means 13a and the background lighting means 13b are preferably electrically connected with each other through permanently installed flexible cables (not shown) extending between the roof member 12 and the top 19 of the background module 20.

The lighting means 13a, 13b are preferably switched on, controlled or, in the case of strobe or flash light, triggered by a signal generated by the shutter of camera 50. For this purpose, an electrical signal connector 32 is disposed on the photo cabin, for example, on the roof member 12, and connected in a known manner to a corresponding contact on the camera 50 by a cable 36.

Preferably, the background module 20 also includes a power connection and/or power source 34, preferably a self-contained power source, such as a battery, for energizing the lighting means. Electrical signal connections (not shown) are provided between signal connector 32 and the power source 34 for controlling the flow of electrical power from the power source 34 to the lighting means 13a, 13b.

Figure 2:
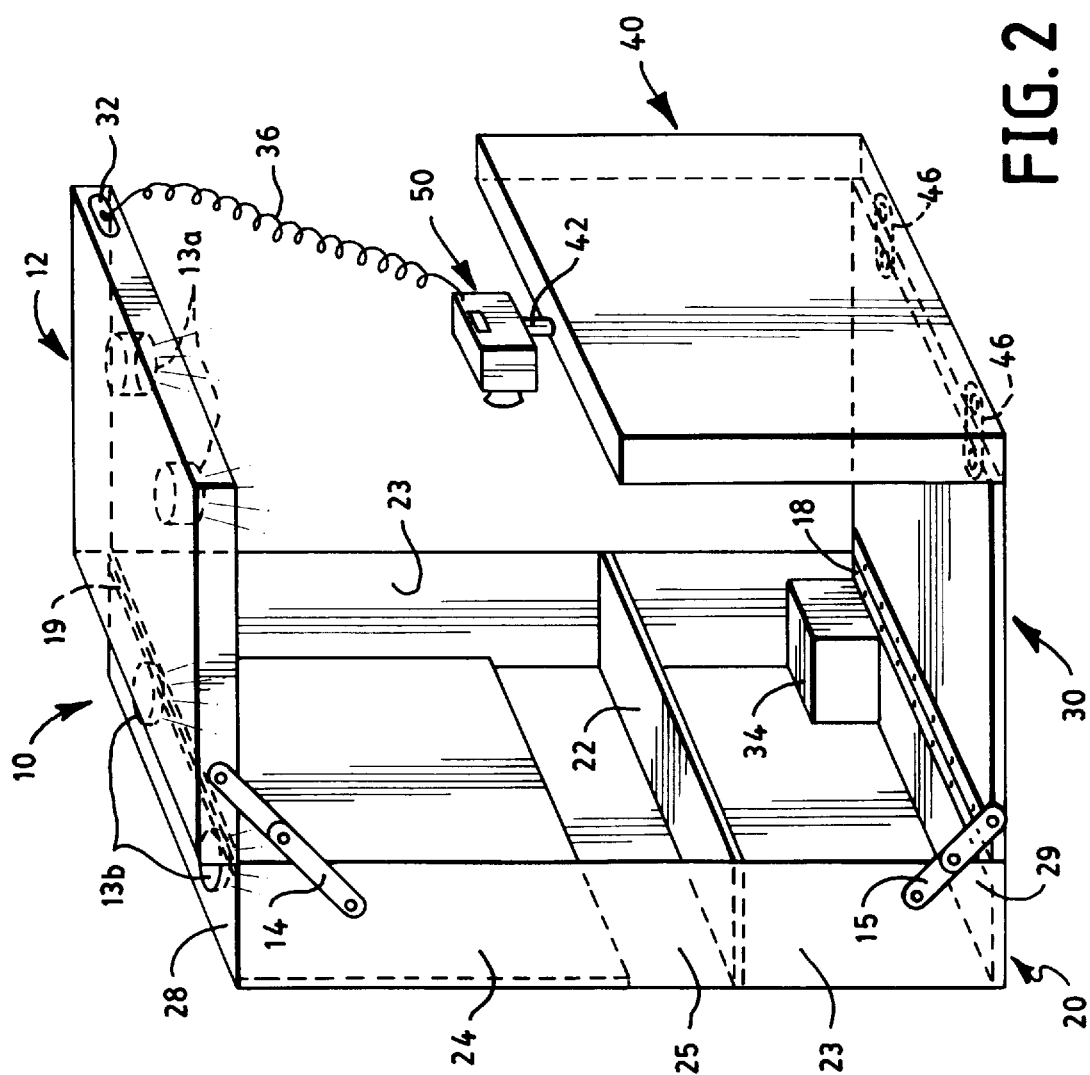
FIG. 2 is a perspective view of the modular photo cabin of FIG. 1 with an attachment for supporting an external camera.

In another preferred embodiment of the invention, as illustrated in FIG. 2, there is furthermore provided a camera support module 40 with a camera support attachment 42 for supporting the camera 50. The support module 40 is adapted to be positioned proximate to the free end of the floor member 30 and can be releasably secured thereto with the help of extendible and/or rotatable bracket assemblies 46. In all other aspects, the background module 20 is constructed identically to the background module 20 illustrated in FIG. 1.

Referring now to FIG. 5a, there is shown the photo cabin of FIG. 2 in the collapsed or folded state arranged for shipping and storing. It is evident that the footprint of the folded photo cabin is considerably smaller than the footprint of the photo cabin in the operational configuration depicted in FIG. 2. Advantageously, the height of the support module 40 in such that the sum of the lengthwise extent of the folded roof member 12 and the height of the support module 40 is the same as the height of the background module 20. When the photo cabin 10 is folded up, the floor member 30 may advantageously be interposed between the background module 20 and the support module 40, as illustrated in FIG. 5a.

Figure 3:
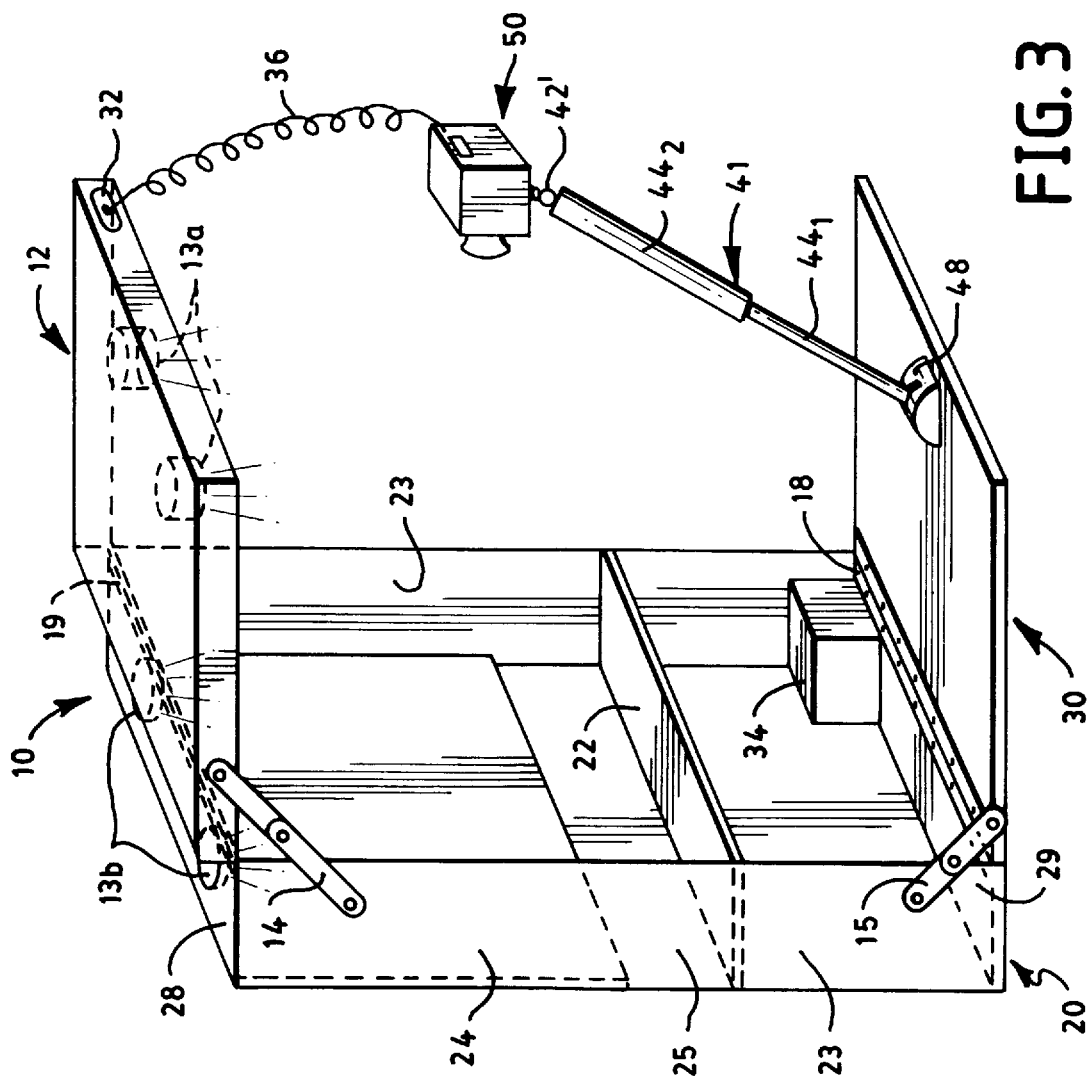
FIG. 3 is a perspective view of the modular photo cabin of FIG. 1 with a differently designed camera support attachment.

In another preferred embodiment, illustrated in FIG. 3, the photo cabin 10 of FIG. 1 may include a tubular stand 41 adapted to support the camera 50. The tubular stand 41 may be collapsible, comprising at least two nested tubular members $44_1$, $44_2$, with a camera support attachment 42' disposed at one end of one of the tubular members $44_2$. The end of the tubular stand 41 or of the nested tubular member $44_1$ facing away from the camera attachment 42' is advantageously hingedly attached with the help of a hinge 48 proximate to the free end of the floor member facing away from the floor hinge 18. Hinge 48 may preferably be lockable in one or several positions and/or orientations.

Figure 4:
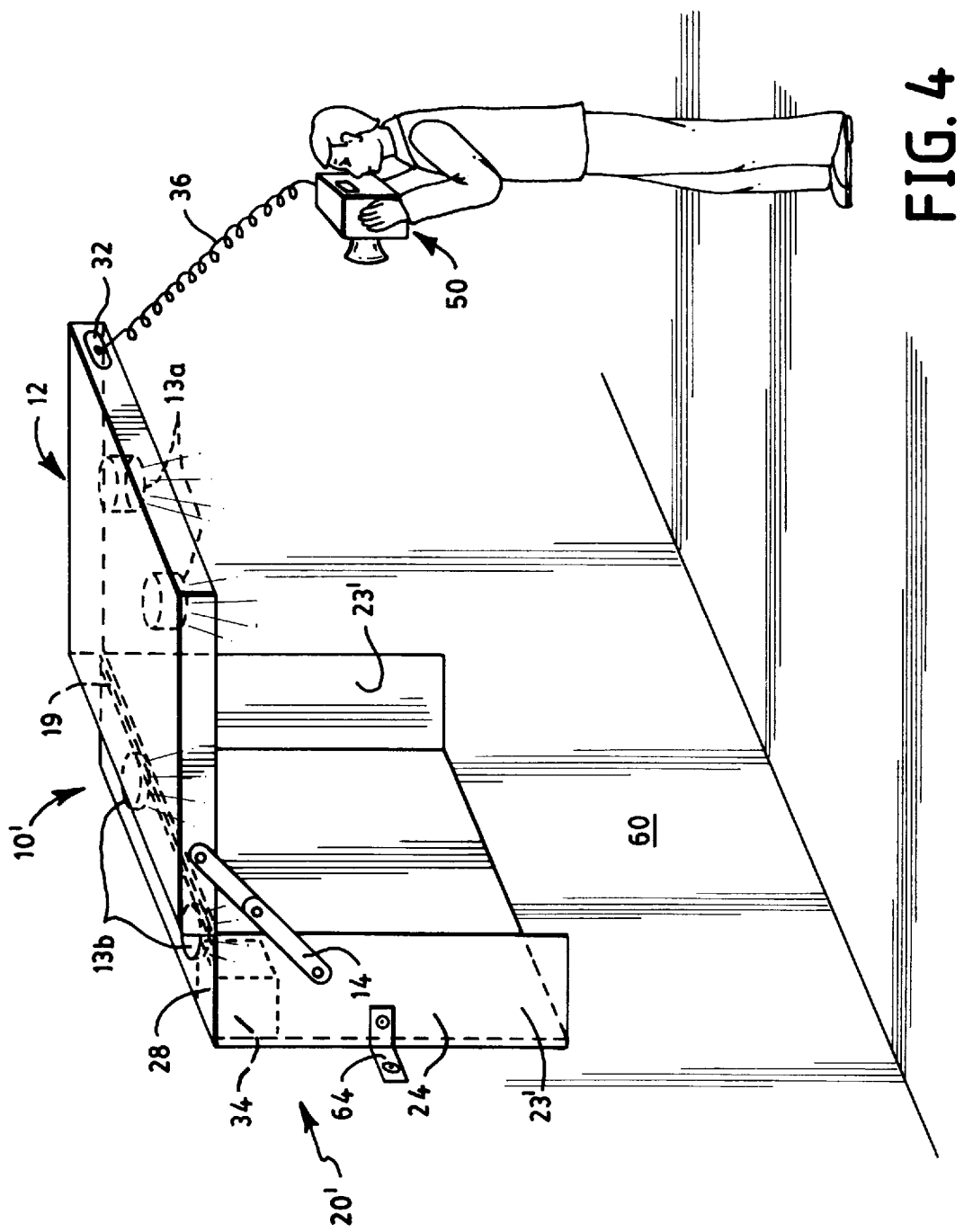
FIG. 4 is a perspective view of a different embodiment of the photo cabin of the invention of FIG. 1 adapted for wall mounting.

In another preferred embodiment illustrated in FIG. 4, the photo cabin 10' is adapted for attachment to an external structural support 60, such as a vertical wall of a building, thereby obviating the need for the floor member 30 of FIGS. 1 to 3. For this purpose, the background module 20 is provided with fasteners 64 (only one is shown in FIG. 4), such as brackets mounted at a suitable location on the background module 20'. The photo cabin 10' preferably still includes the roof member 12 for housing the subject lighting means 13a and the connector 32 and electrical connections for activating the subject lighting means. Subject lighting means 13b and the electrical power connection/source 34 (not shown in FIG. 4) of FIGS. 1 to 3 may also be included. Photo cabin 10' is adapted to be folded for storage and transport in the manner illustrated in FIG. 5b.

While there have been described what at present are considered to be the preferred embodiments of the present invention, it will be readily apparent to those skilled in the art that various changes and modifications may be made therein without departing from the invention, and it is intended in the appended claims to cover such changes and modifications as fall within the true spirit and scope of the invention.

What is claimed:

1. A photo cabin for capturing an image of a subject, the cabin comprising:

a background module comprising a plurality of wall members cooperatively connected to define a subject receiving space including means for providing a background for the image;

a floor member having two ends, the first floor end comprising a floor hinge secured to the background module for pivoting the floor member about a horizontal pivot axis of the floor hinge;

a roof member having two ends, the first roof end comprising a roof hinge secured to the background module for pivoting the roof member about a horizontal pivot axis of the roof hinge;

means for releasably locking both the floor member and the roof member in a substantially perpendicular orientation with respect to the background module.

2. The photo cabin of claim 1, further comprising subject lighting means disposed in at least one of the background module or the roof member.

3. The photo cabin of claim 2, further comprising electrical connection means between the subject lighting means of the background module and of the roof member.

4. The photo cabin of claim 2, wherein said subject lighting means comprises strobe lights.

5. The photo cabin of claim 2, further comprising signal connection means adapted to receive an electrical signal for activating said subject lighting means.

6. The photo cabin of claim 2, further comprising electrical power means for providing electrical power to said subject lighting means.

7. The photo cabin of claim 6, wherein said electrical power means comprises a battery.

8. The photo cabin of claim 1, further comprising a camera support member adapted to support a camera.

9. The photo cabin of claim 8, wherein said camera support member comprises one or more wall members cooperatively connected to each other and wherein said camera support member is adapted to be positioned next to and releasably attached to the free end of said floor member.

10. The photo cabin of claim 8, wherein said camera support member comprises a stand hingedly attached to said floor member.

11. The photo cabin of claim 10, wherein said stand comprises a plurality of telescopic nested tubular members for adjusting the length of said stand.

12. A photo cabin for capturing an image of a subject, the cabin comprising:

a background module comprising a plurality of wall members cooperatively connected to define a subject receiving space including means for providing a background for the image, said background module adapted to be secured to a wall support;

a roof member having two ends, the first roof end comprising a roof hinge secured to the background module for pivoting the roof member about a horizontal pivot axis of the roof hinge;

means for releasably locking the roof member in a substantially perpendicular orientation with respect to the background module;

subject lighting means disposed in at least one of the background module or the roof member; and signal connection means adapted to receive an electrical signal for activating said subject lighting means.

* * * * *